(12) United States Patent
Burritt et al.

(10) Patent No.: US 9,197,449 B1
(45) Date of Patent: *Nov. 24, 2015

(54) APPARATUS AND METHOD FOR PROVIDING ENHANCED TELECOMMUNICATION TERMINAL STATUS INFORMATION

(75) Inventors: David Ray Burritt, Broomfield, CO (US); Bruce Mazza, Thornton, CO (US); Paul Roller Michaelis, Louisville, CO (US); Robert Mitchell, Aberdeen, NJ (US); Matthew Jerome Stevens, Thornton, CO (US); Roger Leon Toennis, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 2410 days.

This patent is subject to a terminal disclaimer.

(21) Appl. No.: 11/145,375

(22) Filed: Jun. 3, 2005

Related U.S. Application Data

(63) Continuation-in-part of application No. 10/799,423, filed on Mar. 12, 2004, now abandoned, and a continuation-in-part of application No. 10/406,341, filed on Apr. 3, 2003, now Pat. No. 7,480,376, and a continuation-in-part of application No. 10/251,249, filed on Sep. 20, 2002, now Pat. No. 7,843,899.

(51) Int. Cl.
*H04L 12/66* (2006.01)
*H04M 1/247* (2006.01)

(52) U.S. Cl.
CPC .............. *H04L 12/66* (2013.01); *H04M 1/247* (2013.01); *H04Q 2213/1309* (2013.01); *H04Q 2213/13175* (2013.01); *H04Q 2213/13378* (2013.01)

(58) Field of Classification Search
CPC ............... H04L 12/66; H04Q 2213/13175; H04Q 2213/1309; H04Q 2213/13378; H04M 1/247
USPC .............. 370/352; 379/9, 142.06; 704/260; 345/1.3; 455/422.1
See application file for complete search history.

(56) References Cited

U.S. PATENT DOCUMENTS

| | | | |
|---|---|---|---|
| 5,220,674 A | 6/1993 | Morgan et al. | |
| 5,548,729 A | 8/1996 | Akiyoshi | |
| 5,809,415 A * | 9/1998 | Rossmann | 455/422.1 |
| 6,192,341 B1 | 2/2001 | Becker et al. | |
| 6,421,425 B1 | 7/2002 | Bossi et al. | |
| 6,628,644 B1 | 9/2003 | Nelson et al. | |

(Continued)

*Primary Examiner* — Mark Rinehart
*Assistant Examiner* — Gbemileke Onamuti
(74) *Attorney, Agent, or Firm* — John C Moran

(57) ABSTRACT

A method and apparatus provide telecommunication terminal status information as enhanced telecommunication terminal status information by establishing communication with a telecommunication switching system controlling a telecommunication terminal by a monitor computer; directly accessing the telecommunication terminal status information from the telecommunication switching system by the monitor computer via a path distinct from that used to transmit the telecommunication terminal status information to the telecommunication terminal; converting the telecommunication terminal status information to enhanced terminal status telecommunication terminal status information by the monitor computer; and presenting the enhanced telecommunication terminal status information to a user of the telecommunication set. The telecommunication set may be a multi-paged telecommunication set. Further, the method and apparatus allow an individual to observe telecommunication terminals of an observed group by receiving enhanced telecommunication terminal status concerning the status of these telecommunication terminals.

70 Claims, 14 Drawing Sheets

(56) References Cited

U.S. PATENT DOCUMENTS

| | | |
|---|---|---|
| 6,661,779 B2 | 12/2003 | Johnson et al. |
| 6,665,375 B1 | 12/2003 | Forlenza et al. |
| 6,678,659 B1 * | 1/2004 | Van Kommer ................ 704/260 |
| 6,772,210 B1 | 8/2004 | Edholm |
| 6,816,578 B1 | 11/2004 | Kredo et al. |
| 6,950,501 B1 | 9/2005 | Chaturvedi et al. |
| 6,975,712 B1 | 12/2005 | Schnarel et al. |
| 7,034,853 B2 * | 4/2006 | Cho et al. ....................... 345/1.3 |
| 7,061,902 B1 * | 6/2006 | Fukuyama et al. ........... 370/352 |
| 7,113,503 B1 | 9/2006 | Basore |
| 7,197,120 B2 | 3/2007 | Luehrig et al. |
| 7,286,649 B1 | 10/2007 | Nelson et al. |
| 7,406,710 B1 | 7/2008 | Zellner |
| 2001/0021186 A1 | 9/2001 | Ono |
| 2002/0057765 A1 | 5/2002 | Hyziak et al. |
| 2002/0090980 A1 | 7/2002 | Wilcox et al. |
| 2002/0159573 A1 | 10/2002 | Hitzeman |
| 2002/0159574 A1 | 10/2002 | Stogel |
| 2003/0005076 A1 | 1/2003 | Koch et al. |
| 2003/0056003 A1 | 3/2003 | Nakatani |
| 2003/0095650 A1 | 5/2003 | Mize |
| 2003/0118007 A1 * | 6/2003 | Williams et al. .............. 370/352 |
| 2003/0214519 A1 | 11/2003 | Smith et al. |
| 2004/0114730 A1 * | 6/2004 | Koch et al. ........................ 379/9 |
| 2005/0094775 A1 | 5/2005 | Smith et al. |
| 2005/0094776 A1 | 5/2005 | Haldeman et al. |
| 2005/0157861 A1 * | 7/2005 | Bossemeyer et al. .... 379/142.06 |
| 2005/0163316 A1 | 7/2005 | Wing |
| 2005/0201542 A1 | 9/2005 | Wengrovitz |

* cited by examiner

APPARATUS AND METHOD FOR PROVIDING ENHANCED TELECOMMUNICATION TERMINAL STATUS INFORMATION

CROSS REFERENCE TO RELATED APPLICATIONS

This patent application is a Continuation In Part of U.S. patent application Ser. No. 10/251,249, filed on Sep. 20, 2002, now U.S. Pat. No. 7,843,899 U.S. patent application Ser. No. 10/406,341, filed on Apr. 3, 2003, now U.S. Pat. No. 7,480,376 U.S. patent application Ser. No. 10/799,423, filed on Mar. 12, 2004, now abandoned and all assigned to the same assignee as the present application. U.S. patent application Ser. No. 10/251,249, U.S. patent application Ser. No. 10/406, 341 and U.S. patent application Ser. No. 10/799,423 are hereby incorporated by reference.

TECHNICAL FIELD

This invention relates to telecommunication switching systems, and in particular, to the provision of telecommunication terminal status information.

BACKGROUND OF THE EMBODIMENTS

In the United States, the Americans with Disabilities Act of 1990, Sections 251 and 255 of the Telecommunications Act of 1996, and Section 508 of the Rehabilitation Act of 1998 require telephones to be accessible to people with disabilities. People who are protected by these laws include individuals who are blind, individuals with low vision, and individuals who are deaf (who typically use a TDD or TTY device in conjunction with their telephone).

Within the prior art, for people who are blind, it is well known to convert visual status indicators of station-specific telephony functions (here after referred to as phone status information) to audio output. Phone status information includes, but is not limited to, caller identification (name and number), call operations, telephony terminal states, and notification that a new voicemail message has arrived.

The prior art has provided the audio information for phone status information by utilizing special hardware to perform voice synthesis. The reliance on specialized hardware has several drawbacks, including:

(1) These hardware adjuncts tend to be very expensive, in part because the overall market is relatively small, but chiefly because different telephones require different versions of the adjunct.

(2) It can be extremely difficult and expensive, if not impossible, to customize the output of these adjuncts in order to satisfy user-specific or environment-specific needs. An example of such a customization would be the ability for users to specify the circumstances and frequency with which certain types of information should be voiced-out automatically.

(3) These adjuncts derive the phone status information by monitoring the signals that are being transmitted to the telephone. After a signal has been transmitted to the phone, illustratively caller ID information or an indication that there is new voicemail, the associated information is no longer accessible to the adjunct—and therefore no longer accessible to the blind user.

For people with low vision, the solutions that are available to people who are blind are often less-than-optimal. This is because, when people are using a telephone, it is undesirable to provide status information by audio output unless it is absolutely necessary. To accommodate the needs of low-vision users, the preferred approach is to present the phone status information visually in an enlarged format, using a display device that permits the users to adjust the color and contrast settings. These capabilities exist within the prior art, but with the same drawbacks and limitations described previously for the blind-oriented audio-output solutions.

For people who are deaf or hard-of-hearing (who typically use a TDD or TTY device in conjunction with their telephone), a significant problem is that they often cannot tell when they have an incoming call unless they are looking at the phone when the call arrives. Within the prior art for analog telephones, of the sort typically found in people's homes, the use of stroboscopic flashers that respond to a "ring signal" on the phone line is well known. No such devices exist for digital or IP telephones, not because they are technically infeasible, but because the use of proprietary signaling protocols in these systems makes it impractical to build a single device that could accommodate the market. For users who have digital or IP telephones, the solution that is recommended by the US Access Board is to run a separate analog line to the user's desk, put an analog stroboscopic flasher on the line, and then administer the phone and the flasher-equipped analog line as bridged line appearances. (With this configuration, the strobe flashes whenever the phone has an incoming call.) This solution tends to be expensive, and does not lend itself well to the needs of a mobile workforce.

Many of the above-described problems are addressed by the previously incorporated patent applications. However, within the context of recent technical advances and recent shifts in market pressures, the solutions proposed in these previously incorporated patent applications are not entirely adequate where the proposed solutions utilize the techniques of a monitoring adjunct that tracks the status of the telephone via a CTI (Computer Telephony Integration) login into the telephone itself.

Whereas the previously incorporated patent applications using the CTI approach solved many of the deficiencies of the prior art, the technical advances and recent shifts in market pressures still present the problems of:

(1) A problem with the CTI approach is that standard digital and analog telephones do not permit CTI logins, thereby limiting this solution to IP telephones. Even with IP phones, support for CTI logins is being curtailed at many locations because of fears that they represent a potential security risk for the IP network.

(2) In addition, the displays of many recent telephones are "paged." Illustratively, on a telephone that can display the status of 36 different functions, it might be possible to display only 12 functions at a time. A user would select "page 1" to show the status of functions 1-12, "page 2" for functions 13-24, and "page 3" for functions 25-36. By virtue of how the CTI mechanisms of the prior art monitor the phone's status, a change that occurs on a page other than the one that is being displayed cannot be detected by the monitoring adjunct. It is not reasonable to expect blind people to keep track of the "page" being displayed visually by their telephone.

SUMMARY OF THE INVENTION

A method and apparatus provide telecommunication terminal status information as enhanced telecommunication terminal status information by establishing communication with a telecommunication switching system controlling a telecommunication terminal by a monitor computer; directly accessing the telecommunication terminal status information from the telecommunication switching system by the monitor computer via a path distinct from that used to transmit the telecommunication terminal status information to the telecommunication terminal; converting the telecommunication terminal status information to enhanced terminal status telecommunication terminal status information by the monitor computer; and presenting the enhanced telecommunication terminal status information to a user of the telecommunication set.

A method and apparatus provide telecommunication terminal status information as enhanced telecommunication terminal status information to a multi-paged telecommunication set by establishing communication with a telecommunication switching system controlling the multi-paged telecommunication terminal by a monitor computer; directly accessing the telecommunication terminal status information from the telecommunication switching system by the monitor computer via a path distinct from that used to transmit the telecommunication terminal status information to the multi-paged telecommunication set; converting the telecommunication terminal status information to enhanced terminal status telecommunication terminal status information by the monitor computer upon a change in the telecommunication terminal status information being detected on any of the pages of the multi-paged telecommunication set; and presenting the enhanced telecommunication terminal status information to a user of the multi-paged telecommunication set.

A method and apparatus allow an observing individual to observe telecommunication terminals of an observed group by receiving enhanced telecommunication terminal status information for the telecommunication terminals of the observed group by: establishing communication with a telecommunication switching system controlling the telecommunication terminals of the observed group by a monitor computer used by the observing individual of the observed group; identifying one of the telecommunication terminals of observed group that is to be observed by the monitor computer; accessing the telecommunication terminal status information for the one of telecommunication terminals from the telecommunication switching system by the monitor computer; converting the accessed telecommunication terminal status information to enhanced telecommunication terminal status information by the monitor computer; and presenting the enhanced telecommunication terminal status information to the observing individual of observed group.

DETAILED DESCRIPTION

Figure 1:
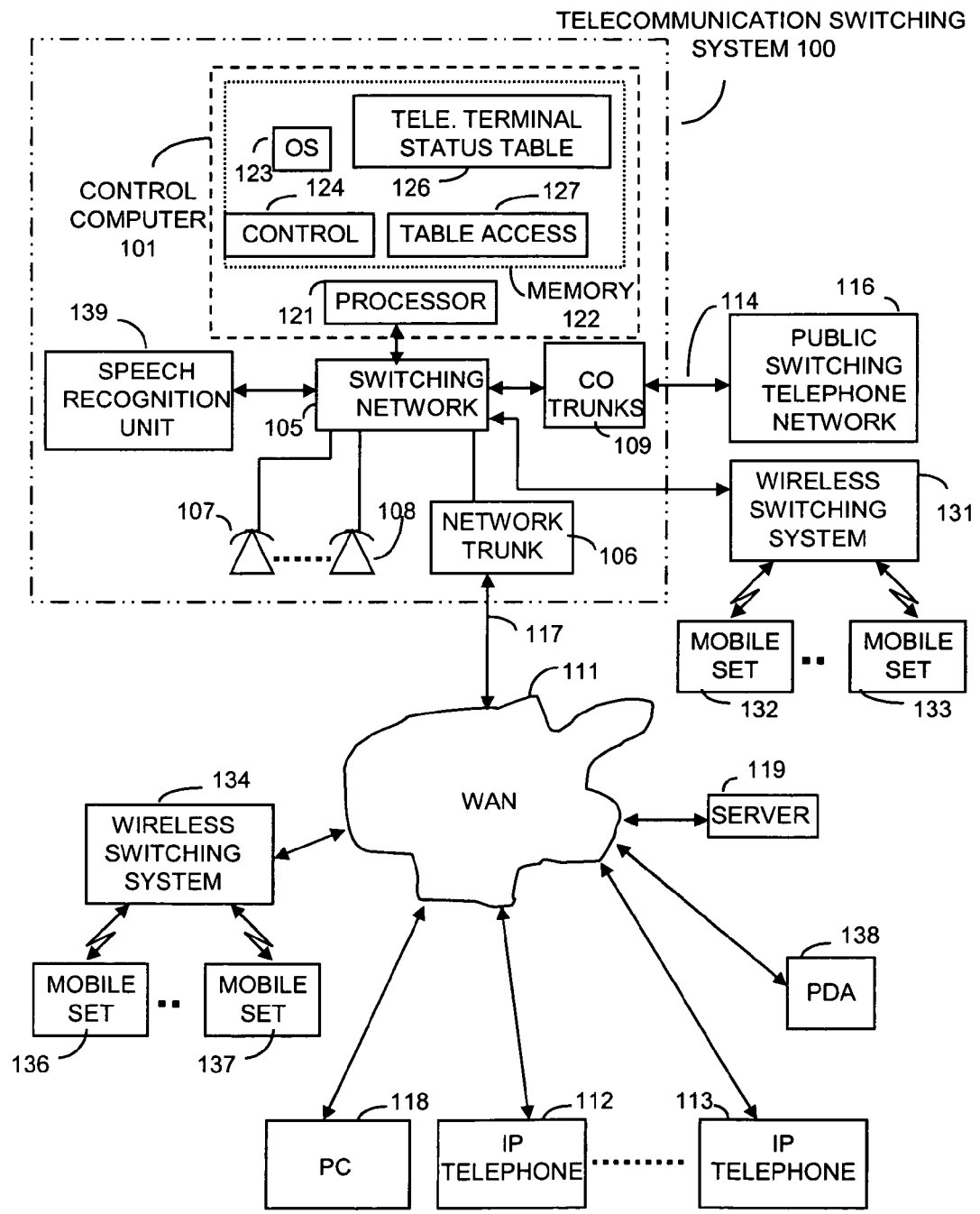
FIG. 1 illustrates, in block diagram form, an embodiment.
Figure 2:
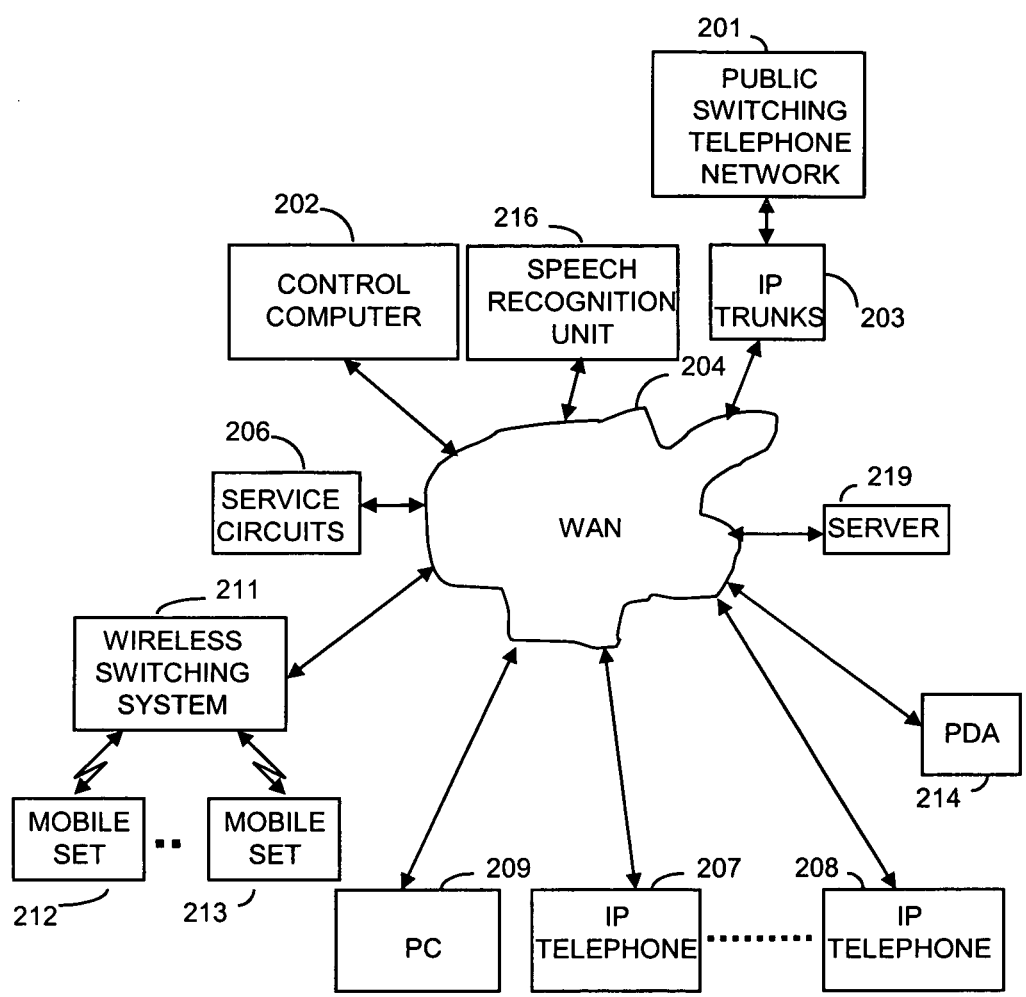
FIG. 2 illustrates, in block diagram form, an embodiment.

FIGS. 1 and 2 illustrate embodiments. In FIG. 1, control computer 101 performs the overall control functions for conventional telephones 107-108 and IP telephone sets 112-113. IP telephone sets 112-113 may be IP telephone set 4624 manufactured by Avaya Inc. or a similar telephone set. Switching network 105 performs the switching of not only audio information but also control information to and from computer 101 to the telephone sets. Speech recognition unit 139 is bridged onto a telephone call by computer 101 to detect when a predefined set of words is uttered at a designated one of the telecommunication terminals indicating that the enhanced telecommunication terminal status information is to be provided to that telecommunication terminal. One skilled in the art would recognize that this speech function could be performed in other units such as a server, personal computer (PC), personal digital assistant (PDA), or a telecommunication terminal. Computer 101 is interconnected to wide area network (WAN) 111 via network trunk 106.

Control computer 101 controls the activity of IP telephone sets 112-113 by the transmission of telecommunication terminal status information and the receipt of telecommunication terminal status information from the IP telephone sets via WAN 111. Control computer 101 controls telephones 107-108 by the transmission of telecommunication terminal status and reception of control information via switching network 105.

Control computer 101 comprises processor 121 and memory 122. Processor 121 performs the necessary control functions by executing programs out of memory 122 as well as storing data in memory 122. Overall control of computer 101 is performed by operating system 123. Control routine 124 performs the overall telecommunication control.

Telecommunication terminal status table 126 is a series of telecommunication terminal status tables, one for each telephone, interconnected to telecommunication switching system 101 whether the telephone be a digital, analog, or IP telephone. When a monitor computer directly access telecommunication terminal status table 126, table access routine 127 controls these accesses. Telephone sets 107-108 can be analog telephone sets, ISDN telephone sets, or proprietary digital protocol telephones sets.

A monitor computer is utilized to provide the enhanced terminal status information representing the telecommunication terminal status signals of one of the IP telephone sets. The monitor computer can be a desktop PC, such as PC 118, personal digital assistant (PDA), such as PDA 138, a server, such as server 119, a control computer in an IP telephone or mobile set, a laptop, a pocket PC, or other digital units well known to those skilled in the art. Note, that although these various embodiments of a monitor computer illustrated as being hardwired, they could be connected by a wireless media.

FIG. 2 illustrates another embodiment. Control computer 202 is controlling the operations of IP telephone sets 207-208 with respect to telecommunication operations by the transmission and reception of control information via WAN 204. Speech recognition unit 216 is bridged onto a telephone call by control computer 202 to detect when a predefined set of words is uttered at a designated one of the telecommunication terminals indicating that the enhanced telecommunication terminal status information is to be provided to that telecommunication terminal. One skilled in the art would recognize that this speech function could be performed in other units such as a server, personal computer (PC), personal digital assistant (PDA), or a telecommunication terminal. Service circuits 206 under the control of control computer 202 provide tone generation, conferencing, etc. via WAN 204 to IP telephone sets 207-208. For a telecommunication call which is only between two IP telephone sets, the IP telephone sets communicate via WAN 204 for the transmission of audio information.

Public switching network 201 is interconnected to WAN 204 via IP trunk 203. The other units of FIG. 2 perform functions similar to similar units of FIG. 1.

Wireless searching system 131 can interface mobile sets 132 through 133 to telecommunication switching system 100 by interconnecting to switching network 105 as is well known in the art. In addition, wireless switching system 134 can interconnect to telecommunication switching system 100 via WAN 111 using techniques well known to those skilled in the art.

In FIGS. 1 and 2, control computers 101 and 202 maintain telecommunication terminal status tables that define all of the telecommunication terminal status information for all telecommunication terminals interconnected to the systems including IP, analog and digital telephones. The monitor computer transmits the telephone number and password for the telephone to be monitored to the control computer of either FIG. 1 or FIG. 2. The control computer verifies that the telephone number and password are correct for that telecommunication terminal. Once it is established that the information is valid, the control computer establishes a socket with the WAN to allow the monitor computer to gain access to the telecommunication terminal status table associated with the identified telecommunication terminal. The telecommunication terminal can be any type of telecommunication terminal using various transmission protocols such as the IP protocol, proprietary digital protocols, ISDN, wireless transmission, analog transmission, etc.

Once the socket is established, the monitor computer periodically accesses the telecommunication terminal status table to determine if there have been any changes in the telecommunication terminal status of the telecommunication terminal. If the monitor computer determines that a change in the telecommunication terminal status information indicates the necessity of presenting enhanced terminal status call information to the user of the identified telecommunication terminal, the monitor computer performs this function.

In another embodiment, the monitor computer is responsive to actuation of a designated button on the telecommunication terminal or a predefined set of words being spoken on the telecommunication terminal to supply part or all of the telecommunication terminal status information in the telecommunication terminal status table as enhanced telecommunication terminal status information to the telecommunication terminal.

In one embodiment of the invention, the enhanced telecommunication terminal status information is emphasized visual information that is used to present to individuals who have a hearing impairment, an indication on the screen that is connected to the monitor, the fact that a change in telecommunication terminal status information such an incoming call is occurring. In addition, the emphasized visual information may also be used by individuals who have poor visual acuity (illustratively, people who may require a magnifying glass in order to read standard-sized text) often have trouble reading the display information that is presented visually by those telecommunication terminals, e.g. the caller ID information. The manner in which this information is presented to such individuals is set forth in the previously incorporated patent applications. The telecommunication terminal status information is obtained by accessing the control status information stored on control computer 101 or 202.

In another embodiment, the emphasized telecommunication terminal status information is presented as audio information by the monitor computer using an audio transducer connected directly to the monitor computer or by the monitor computer transmitting a message containing the audio information to the telephone or mobile set being utilized by the user. The manner in which the transmission of such an audio message is performed is set forth in greater detail in the previously incorporated patent applications.

One embodiment that presents the enhanced telecommunication status information is to use a wireless PDA in conjunction with a mobile set so that an individual having an impairment can receive the enhanced telecommunication terminal status information via the PDA or similarly may also receive it on the mobile set.

The previous embodiments described for FIG. 1 can be implemented on the system illustrated in FIG. 2.

To understand how enhanced telecommunication terminal status information could be provided for a user of telephone set 108, consider the following example. To set up the operations of providing the enhanced telecommunication terminal status information, the user of IP telephone 112 utilizes PC 118 to establish a logical connection with the control computer 101 via WAN 111 and network trunk 106. PC 118 establishes this logical connection to computer 101 by opening a socket on computer 101 to a telecommunication terminal status control routine. The user of PC 118 then identifies IP telephone 112 by telephone number and supplies an optional password to control computer 101. PC 118 then periodically accesses telecommunication terminal status table 126 via table access routine 127 to determine if the telecommunication terminal status information has changed for IP telephone 112.

Monitor computer 118 is responsive to the telecommunication terminal status information and control information received from computer 101 via WAN 111 to perform the previously described operations of providing enhanced telecommunication terminal status information.

The program utilized by a monitor computer to provide the enhanced telecommunication terminal status information may be performed in either a thick client form or a thin client form. These forms are described in greater detail in the previously incorporated patent applications. The thin client form has the advantage of being easier to modify by the owner of the system illustrated in FIG. 1 or the manufacturer as changes are made in the software being executed by control computer 101. In addition, the visual interface in the thin client implementation is a web page and can be more readily modified than the visual interface of the thick client implementation.

Figure 3:
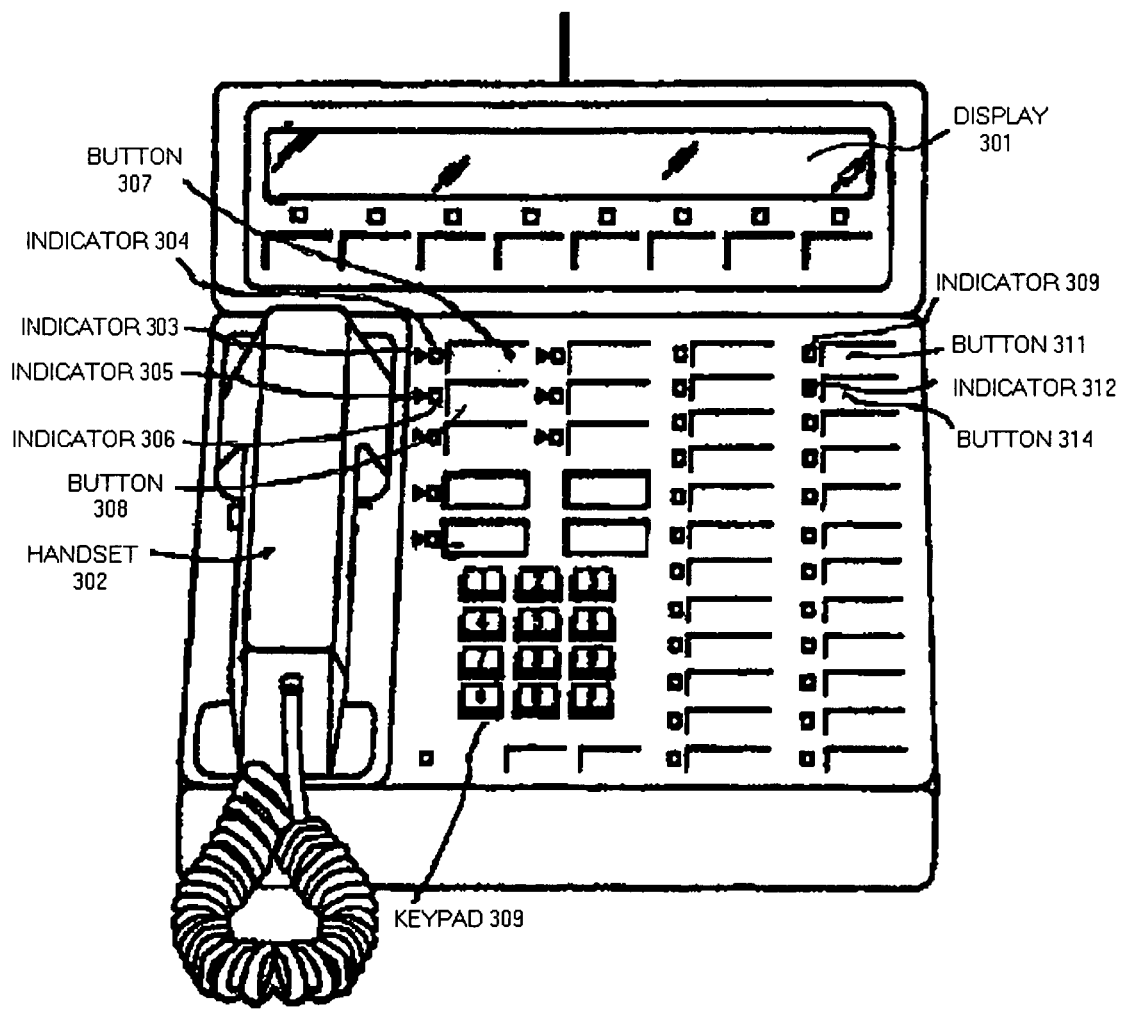
FIG. 3 illustrates, in pictorial form, an embodiment of an IP telephone set.

FIG. 3 illustrates an embodiment of IP telephone set 112. The user of IP telephone set 112 speaks and listens through handset 302. Although not illustrated in FIG. 3, IP telephone set 112 also has a speaker and microphone for conference calls. Display 301 is utilized to display the telephone number being dialed by keypad 309 during the placement of an outgoing call and displays the name and telephone number of the calling party for an incoming call. Display 301 maybe a large multiple-line display and allow the use of soft buttons as is well known to those skilled in the art.

IP telephone set 112 has a number of telephone lines that could be selected with each line being denoted by a pair of indicators and a button. For example, indicators 303 and 304 and button 307 indicate line 1. Indicators 305 and 306 and button 308 indicate line 2. If the user is active on line 1, indicator 304 will be on as well as indicator 303. If the user has a caller on hold on line 2, indicator 305 will flash. The user of IP telephone set 112 selects line 1 by activating button 307. Similarly, the user activates line 2 by activating button 308.

Pairs of indicators and buttons, such as indicator 309 and button 311, may be used for activating a variety of operations. One is to automatically dial a party that had been preprogrammed by the user or to activate a feature such as using the conference facilities of IP telephone set 112. If button 311 is activated, indicator 309 will turn on. Indicator 312 and button 314 have similar functions. In general, there would be a number of such combinations of indicators and buttons as illustrated by 309, 311, 312, and 314. All button activation information is transmitted to control computer 101, and control computer 101 controls the state of the indicators. One of the buttons such as button 314 maybe designated to have the function of causing the monitor computer to convert part or all of the telecommunication terminal status information for IP telephone set 112 in the telecommunication terminal status table to enhanced telecommunication terminal status information for transmission to IP telephone set 112.

Figure 4:
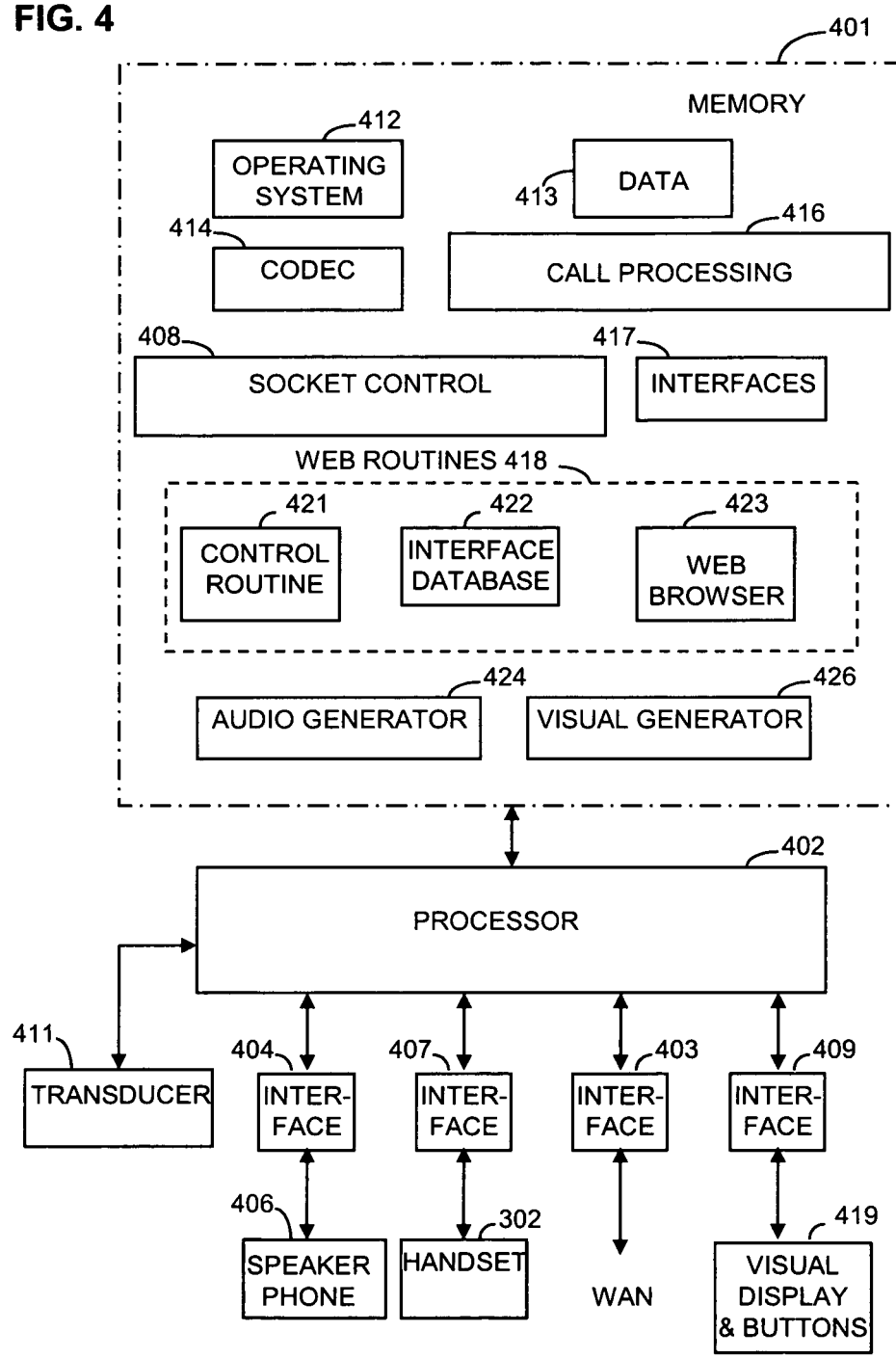
FIG. 4 illustrates, in block diagram form, an embodiment of an IP telephone set.

FIG. 4 illustrates, in block diagram form, one embodiment of IP telephone set 112. Processor 402 provides the overall control for the functions of IP telephone set 112 by executing programs and storing and retrieving data in memory 401. Processor 402 connects to WAN 111 or 204 via interface 403. Processor 402 interfaces to handset 302 via interface 407 and connects to visual display and buttons 419 via interface 409. Visual display and buttons 419 is all of the indicators, buttons keypad, and display illustrated in FIG. 3. Processor 402 performs the operations of IP telephone set 112 by executing the routines illustrated in memory 401.

Operating system 412 provides the overall control and the necessary protocol operations. Operating system routine 412 provides all control functions required to implement the TCP/IP protocol as is well known to those skilled in the art. Data is stored in data block 413. CODEC 414 encodes and decodes the audio information for communication with handset 302 or conference speaker and microphone 406 for communication with WAN 111 or 204. Overall control of the call processing is performed by the IP telephone set 112 under the control of call processing routine 416. The communication and control of the various interfaces illustrated in FIG. 4 is provided by interfaces routine 417.

Socket control routine 408 terminates a socket that is established by a monitor computer to transmit enhanced telecommunication terminal status information for presentation by IP telephone set 112. If the enhanced information is to be presented as audio information, socket control 408 directs this information to audio generator 424 or CODEC 414 depending on which audio transducer is to be utilized to present the enhanced information. If the enhanced information is emphasized visual information, socket control 408 directs it to visual generator 426 which in conjunction with interfaces routine 417 and interface 409 displays the emphasized visual information on visual display and buttons 419.

Operating system 412 is responsive to messages from the monitor computer to establish the socket that allows the monitor computer to communicate the enhanced telecommunication terminal status information. When the monitor computer opens a socket on IP telephone set 112, it uses the IP address for IP telephone set 112 to transmit a message to a TCP/IP port on IP telephone set 112 that is associated with socket control 408. Operating system 412 is responsive to this message to establish a socket for the monitor computer to receive the enhanced telecommunication terminal status information. This socket terminates and allows the monitor computer to be interconnected with control socket 408.

Control socket 408 then determines whether the information is destined for audio generator 424 or visual generator 426. The above incorporated patent applications set forth this operation in greater detail.

Web routines 418 allow processor 402 to implement the functions of a monitor computer in the thin client mode. Greater details on how processor 402 utilizes web routines 418 to perform the functions of a monitor computer are set forth in the previously incorporated patent applications. Note, that if processor 402 is to implement a thick client, control routine 421 and interface database 422 would be permanently stored in memory 401. In the thin client mode, web browser 423 is utilized to access control routine 421 and interface database 422 from a server such as server 119.

Figure 5:
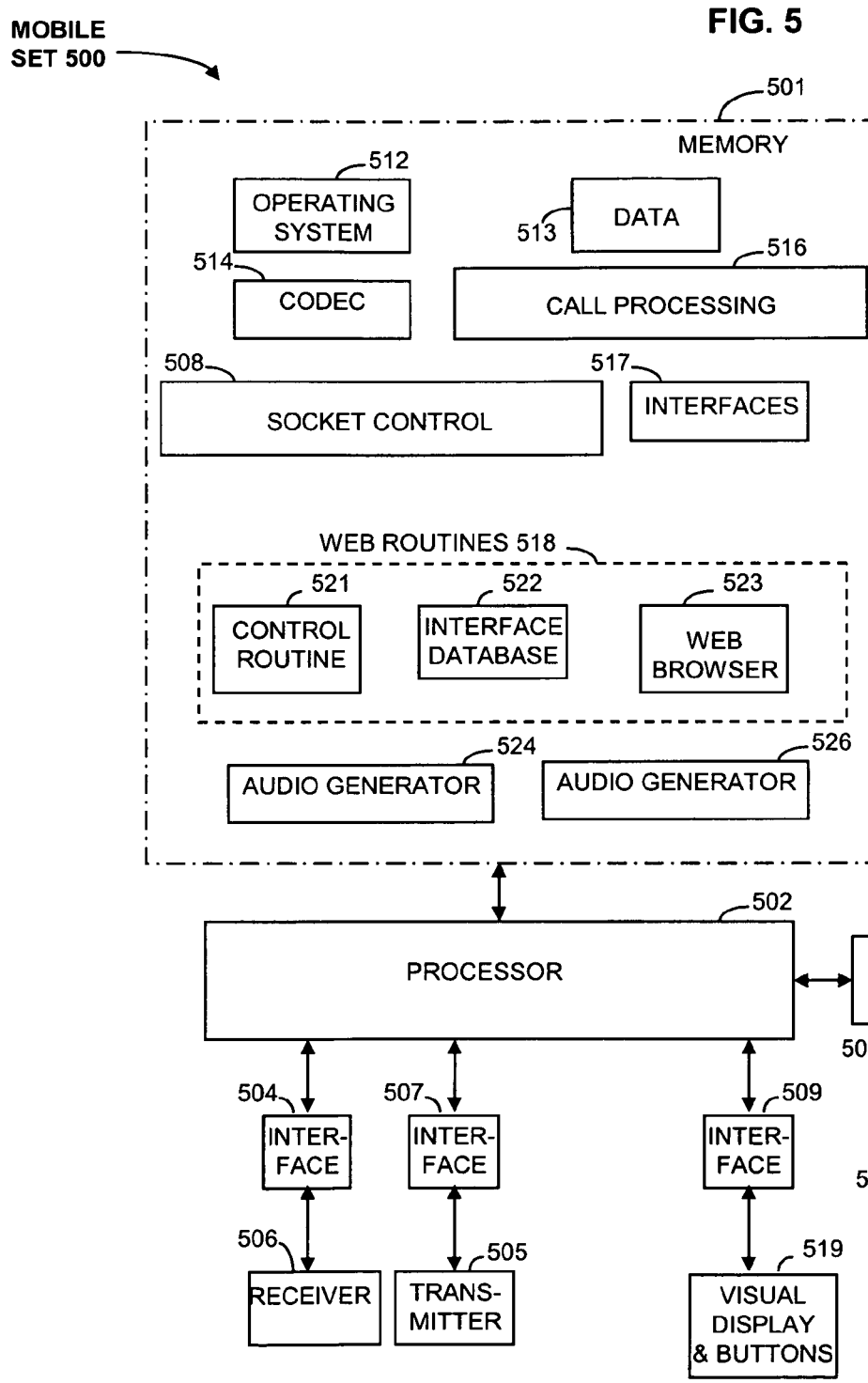
FIG. 5 illustrates, in block diagram form, an embodiment of a mobile set.

FIG. 5 illustrates, in block diagram form, mobile telecommunication terminal 500 also referred to as a cellular telephone or wireless telephone. The functions of software blocks 508 512-518, 524 and 526 are similar to those performed by software blocks 408 412-418, 424 and 426 of FIG. 4. Processor 502 performs overall control and is the control controller for the mobile set. Receiver 506 that receives audio information is interfaced to processor 502 via interface 504. Transmitter 505, which transmits audio information, is interfaced to processor 502 via interface 502. Visual display and control buttons utilized by the user of the mobile set are illustrated as block 519 and are interfaced via interface 509 to processor 502. RF circuit 503 in conjunction with antenna 511 performs the necessary RF functions for the mobile set. Processor 502 performs all control functions utilizing application blocks stored in memory 501. One of the buttons in visual display & buttons 519 maybe designated to have the function of causing the monitor computer to convert part or all of the telecommunication terminal status information for mobile telecommunication terminal 500 in the telecommunication terminal status table to enhanced telecommunication terminal status information for transmission to mobile telecommunication terminal 500. In addition, this function may be activated by the user of mobile telecommunication terminal 500 speaking a predefined set of words.

Figure 6:
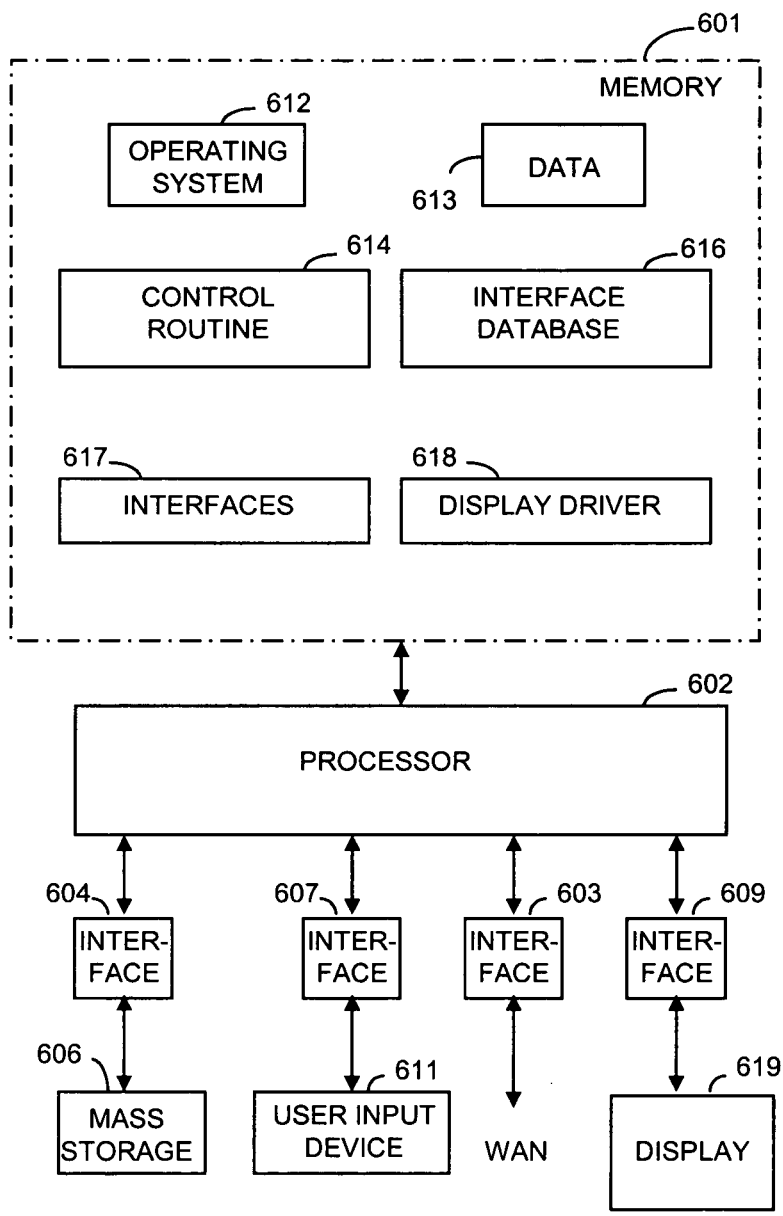
FIG. 6 illustrates, in block diagram form, an embodiment of a monitor computer.

FIG. 6 illustrates, in block diagram form, one embodiment of a monitor computer in which the monitor computer is a PC. Processor 602 provides the overall control for the functions of a monitor computer by executing programs and storing and retrieving data from memory 601. Processor 602 connects to WAN 111 or 204 via interface 603. Processor 602 interfaces to user input device 611 via interface 607 and connects to display 619 via interface 609. Processor 602 performs the operations of a monitor computer by executing the routines illustrated in memory 601.

Operating system 612 provides the overall control and the necessary protocol operations. Operating system routine 612 provides all control functions required to implement the TCP/IP protocol as is well known to those skilled in the art. Data is stored in data block 613. Interface database 616 stores preferences and options that define the user interface. Overall control is performed by control routine 616. The communication and control of the various interfaces illustrated in FIG. 6 is provided by interfaces routine 617. Display driver 618 controls the displaying of information on display 619.

Figure 7:
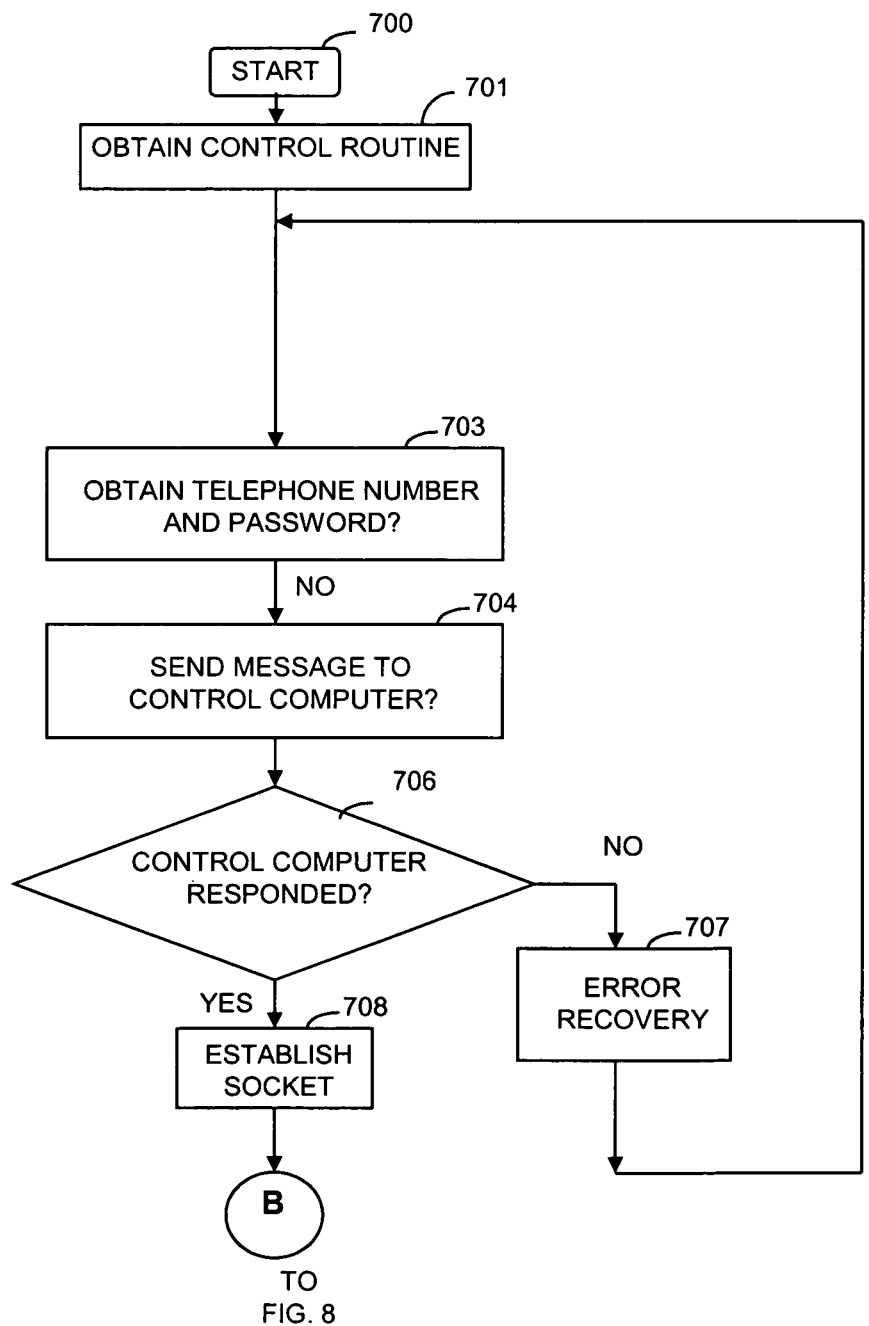
FIGS. 7-9 illustrate, in flow chart form, operations performed by embodiment of a monitor computer.
Figure 8:
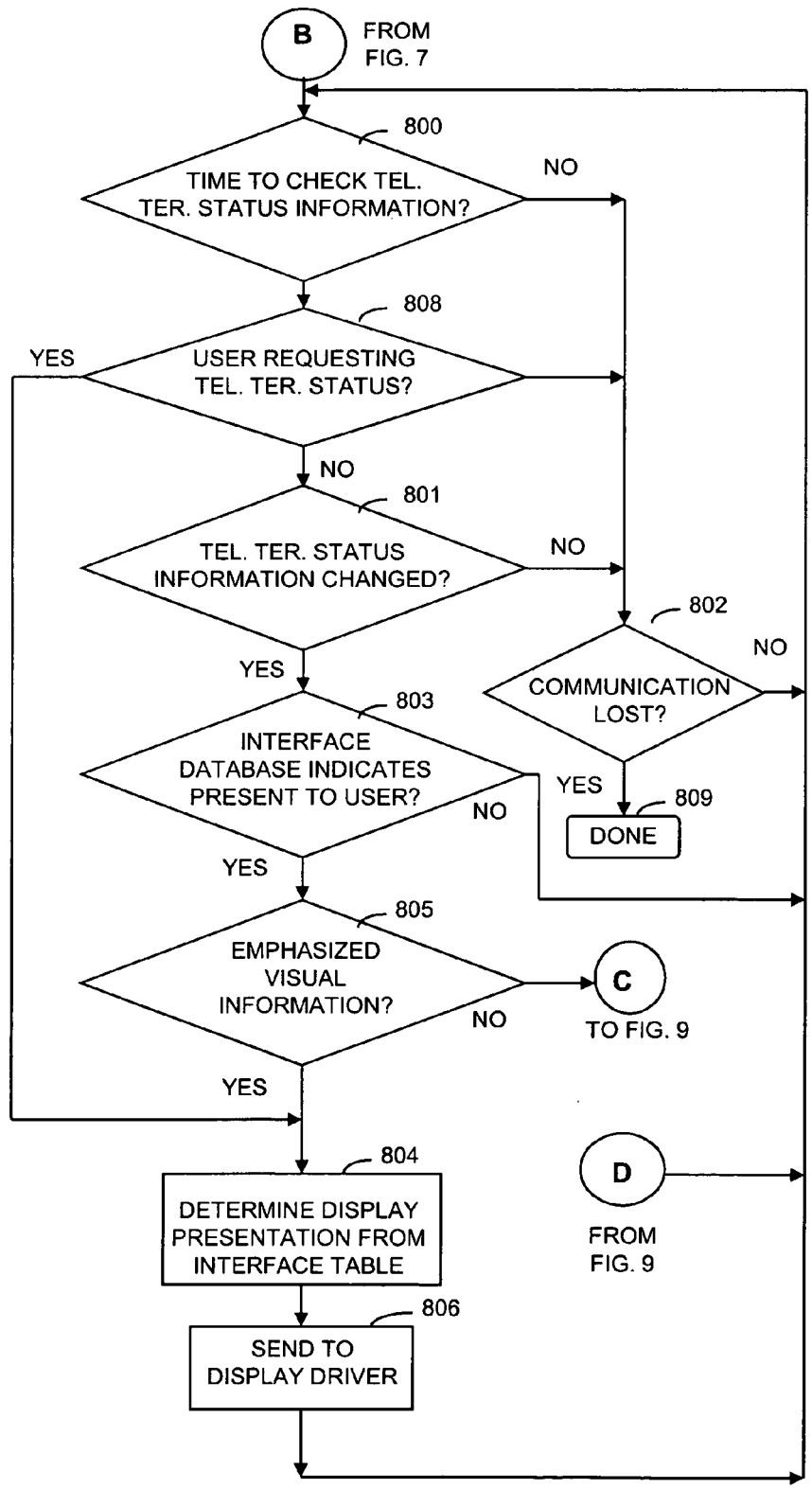
Figure 9:
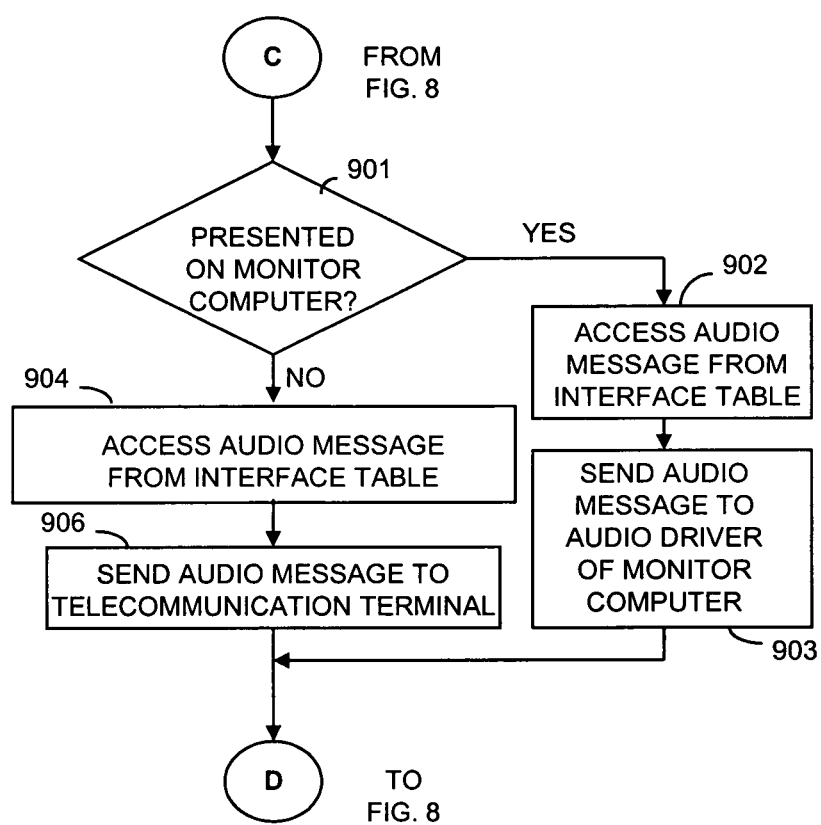

FIGS. 7 and 8 illustrate, in flowchart form, operations performed by one embodiment of a monitor computer such as PC 118 of FIG. 1 where the monitor computer is receiving the telecommunication terminal status information from a control computer that is controlling a switching system, such as telecommunication switching system 100. After being started, in block 700, block 701 obtains the control routine whose operations are illustrated in FIGS. 7-9. The control routine will be obtained from internal memory if the embodiment is implementing a thick client implementation; and the control routine will be obtained from a server, such as server 119 if the embodiment is implementing a thin client implementation.

After the control routine is obtained and executed, block 703 obtains the telephone number and password for the telephone set that is to be monitored. Block 703 may perform this operation by obtaining it from a server such as server 119. In addition, the user may know the telephone number and the password and enter it manually. After execution of block 703, block 704 transmits the telephone number and password to the control computer.

After execution of block 704, control is transferred to decision block 706 which determines if the control computer responded and accepted the telephone number and the password as valid. One skilled in the art would readily realize that the telephone number and password could be encrypted so that it was not possible for a computer to fraudulently gain access to the control status information of a telephone set.

If the answer in decision block 706 is no, control is transferred to block 707 which performs error recovery before transferring control back to block 703. If the answer is decision block 706 is yes, block 708 establishes a socket with the operating system of the control computer to obtain access to a telecommunication terminal status table that the control computer maintains for the telephone. The socket establishes communication to the telecommunication terminal status control routine of the control computer before transferring control to decision block 800 of FIG. 8.

Decision block 800 determines if it is time to check the telecommunication terminal status information for a telephone by accessing the telecommunication terminal status table on the control computer. If the answer is no in decision block 800, control is transferred to decision block 802. Decision block 802 determines if communication has been lost between the monitor computer and the control computer. If the answer is yes, operations are terminated in block 809. In addition to transferring control to block 809 upon communication being terminated between the monitored computer and the control computer, decision block 802 also is responsive to user input to terminate operations. If the answer is no in decision block 802, control is transferred back to decision block 800.

Returning to decision block 800, if the answer is yes in decision block 800, control is transferred to decision block 808. Decision block 808 determines if the user is requesting that part or all of the telecommunication terminal status information in the telecommunication terminal status table be converted to enhanced telecommunication terminal status information and presented to the user. The user can make this request by actuation of a designated button on the telecommunication terminal, predefined key/keys on the monitor computer, or by speaking a predefined set of words. Information in block 804 determines if part or all of the telecommunication terminal status information will be converted. If the answer is yes in decision block 808, control is transferred to decision block 805 whose functions are described in later paragraphs. If the answer is no in decision block 808, control is transferred to decision block 801.

Decision block 801 determines if telecommunication terminal status information has changed for the telephone set. If the answer is no, control is transferred to decision block 802. If the answer is yes in decision block 801, control is transferred to decision block 803 which access the interface database to determine if the particular telecommunication terminal status information should be presented to the user. If the answer is no in decision block 803, control is transferred back to decision block 800. If the answer is yes in decision block 803, control is transferred to decision block 805.

Decision block 805 determines if emphasized visual information is to be presented. If the answer is yes, control is transferred to block 804. If the answer is no, control is transferred to decision block 901 of FIG. 9.

Block 804 accesses the appropriate visual screen from the interface database, and block 806 transmits the appropriate visual screen to the display of the monitor computer before transferring control back to decision block 801.

FIG. 9 illustrates the operations performed when control is transferred from decision block 805 of FIG. 8. Upon receiving control, decision block 901 determines if the enhanced information is to be presented on the monitor computer. (This enhanced information is to be presented to the user of the telephone set as an audio message.) If the answer is yes in decision block 901, control is transferred to block 902 which access the proper audio message from the interface table which converts the telecommunication terminal status information to the equivalent or similar audio message. Block 903 then transmits the audio message to the audio driver of the monitor computer. The audio driver of the monitor computer plays this audio message on a speaker connected to the monitor computer.

If the answer in decision block 901 is no, block 904 accesses the audio message from the interface table. The access audio message is then transmitted to the telecommunication terminal that is the subject of the telecommunication terminal call status information so that the information can be presented by terminal to the user. After execution of either block 906 or 903, control is returned back to decision block 800 of FIG. 8.

Certain types of telephone sets are more difficult for a seeing impaired person to use. In particular, telephone sets (such as telecommunication terminal 1100 of FIG. 11) where the display, either a CRT or LCD display, utilizes so called soft buttons with the different meaning of these buttons being changed as different pages are displayed on the screen of the telephone set. For example, the first page may include the status of the buttons and line appearances that are terminated on the telephone set; whereas, the second page may include such indicators and soft buttons for "send all calls" or "message waiting".

The operations illustrated in FIGS. 8 and 9 assist the seeing impaired person in operating with such a set by presenting the enhanced telecommunication terminal status information whenever that information changes regardless of the page that is being shown on the user's telephone set. For example, where the enhanced information is presented as an audio message, any change that is detected in the telecommunication terminal status table for the telephone set will be presented as an audio message to the user. In addition, actuation of a designated button on the user's telephone set, one or more keystrokes on the monitor computer, or the user speaking a predefined set of words will cause part or all of the telecommunication terminal status information for the telephone set to be presented as an audio message to the user. This greatly assists the seeing impaired individual in using these large displays, soft button based telephone sets.

Figure 10:
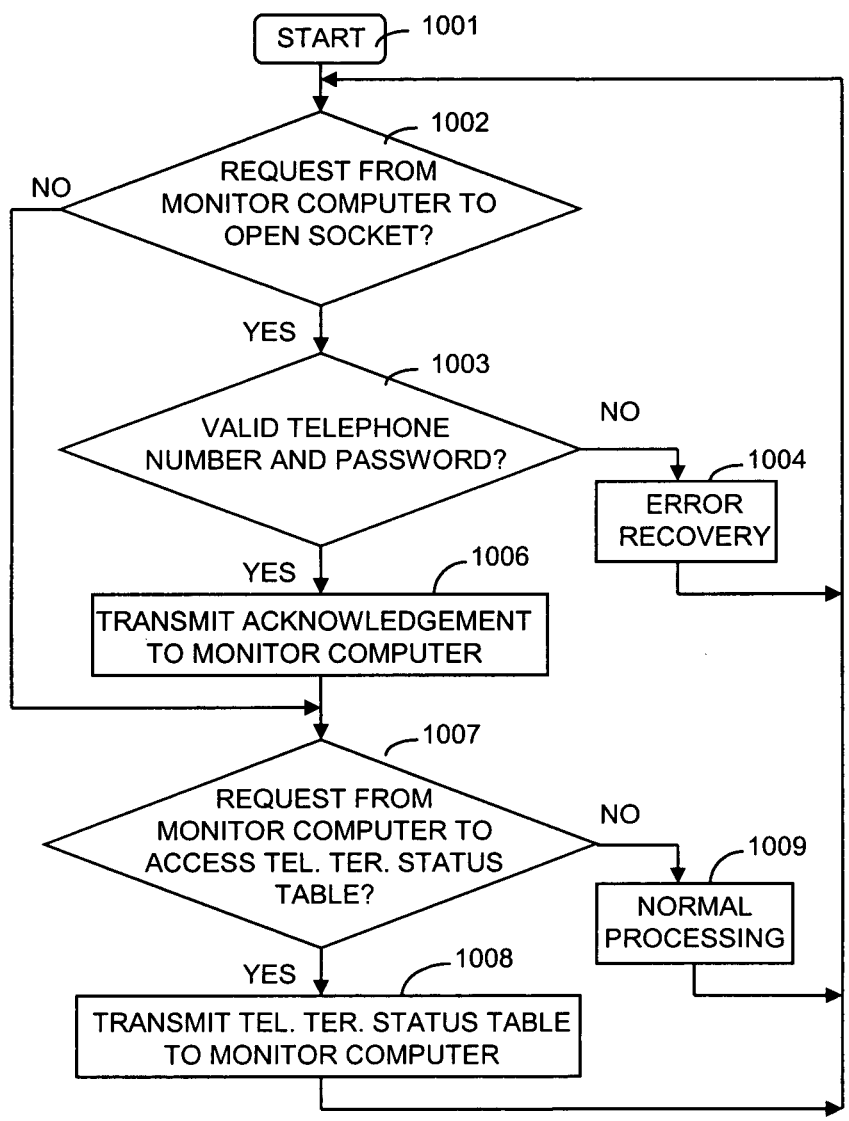
FIG. 10 illustrates, in flow chart form, operations performed by an embodiment of a control computer.

FIG. 10 illustrates an embodiment of the operations performed by a control computer when a monitor computer is access a telecommunication terminal status table stored in the control computer. As is well known by those skilled in the art, a control computer controlling the operations of a telecommunication system maintains a telecommunication terminal status table for each telephone connected to the telecommunication system regardless of whether this telephone is an IP, analog, proprietary digital protocol telephone, or ISDN telephone. Once started in block 1001, the control computer determines if there is a request from a monitor computer to open a socket to gain access to a telecommunication terminal status table for a telephone. If the answer is no, control is transferred to decision block 1007. If the answer is yes in decision block 1002, control is transferred to decision block 1003. The latter decision block determines if the request from the monitor computer contains a valid telephone number and password. If the answer is no, control is transferred to error recovery block 1004 which performs error recovery before transferring control back to decision block 1002. If the answer in decision block 1003 is yes, block 1006 transmits an acknowledgement to the monitor computer and sets up the necessary socket and software so that the monitor computer can obtain the requested telecommunication terminal status table. Then block 1006 transfers control to decision block 1007.

Decision block 1007 determines if there is a request from a monitor computer to access a telecommunication terminal status table for a particular telephone. The monitor computer has to establish a socket via the operations of block 1006 to perform a request for a particular telephone. If the answer is no in decision block 1007, control is transferred to block 1009 which performs normal processing before transferring control back to decision block 1002. If the answer in decision block 1007 is yes, block 1008 transmits the telecommunication terminal status table for the particular telephone to the monitor computer before transferring control back to decision block 1002.

Figure 11:
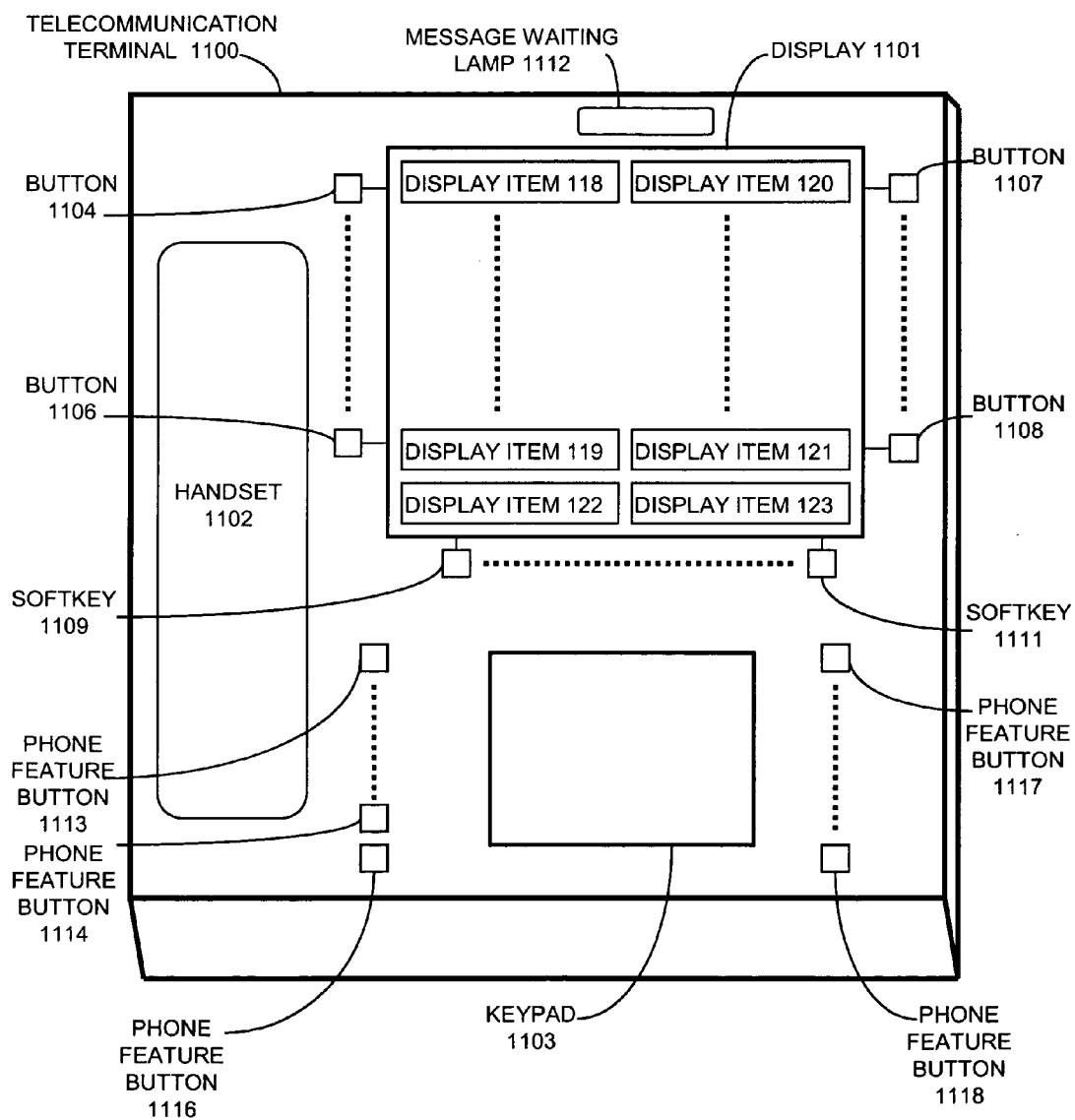
FIG. 11 illustrates, in pictorial form, an embodiment of a multi-paged telecommunication terminal.

FIG. 11 illustrates telecommunication terminal 1100 which is a multi-page type telecommunication terminal. Display 1101 can display a plurality of different display items with each page having different display items such as display items 1118-1123. In addition, a display item can be the same from page to page. Avaya 4620 IP telephone is an example of such a multi-page telecommunication terminal.

Display 1101 may have the capability of displaying six or more lines of text data and also graphical output. Each text line can be broken into different display items. For example, the first text line illustrates display items 1118 and display items 1120. Each display item has associated with it a programmable button or soft key. Display items 1118 through 1119 have associated with them feature/line buttons 1104-1106 and display items 1120-1121 have associated with them feature/line buttons 1107-1108. The display item defines the function or line represented by a particular feature/line button.

Display items 1122-1123 have associated with them soft keys 1109-1111. For example, the display item 1122 displays the operation that will occur upon actuation of soft key 1109. The functions of the feature/line buttons and soft keys can be modified depending on the page that is being displayed on display 1101.

Message waiting lamp 1112 indicates if there is a message waiting for this particular telecommunication terminal.

Phone feature buttons 1113-1118 normally are not customer programmable and have a fixed result when activated. For example, phone feature buttons 1114 and 1116 may control the movement from one page to another page. Another phone feature button may control whether or not the speaker phone capabilities are going to be utilized for telecommunication terminal 1100.

Keypad 1103 provides the capabilities of a standard 12 button pad that is commonly used for the dialing of telephone numbers.

One of the feature/line buttons, such as feature/line button 1104, may be designated to have the function of causing the monitor computer to convert part or all of the telecommunication terminal status information for telecommunication terminal 1100 in the telecommunication terminal status table to enhance telecommunication terminal status information for transmission to telecommunication terminal 1100 or other designations. In addition, this function may be activated by the user of telecommunication terminal 1100 speaking a predefined set of words. In addition, display 1101 can be utilized to present emphasized visual telecommunication status information to the user of telecommunication terminal 1100.

The internal structure of telecommunication terminal 1100 would be similar to that illustrated in FIG. 4 with display 1101, feature/line buttons 1104-1108, software keys 1109-1111, phone feature buttons 1113-1118, and keypad 1103 being part of a block similar to visual display and buttons block 419 of FIG. 4. The contents of memory 401 would be similar in functions for telecommunication terminal 1100.

Figure 12:
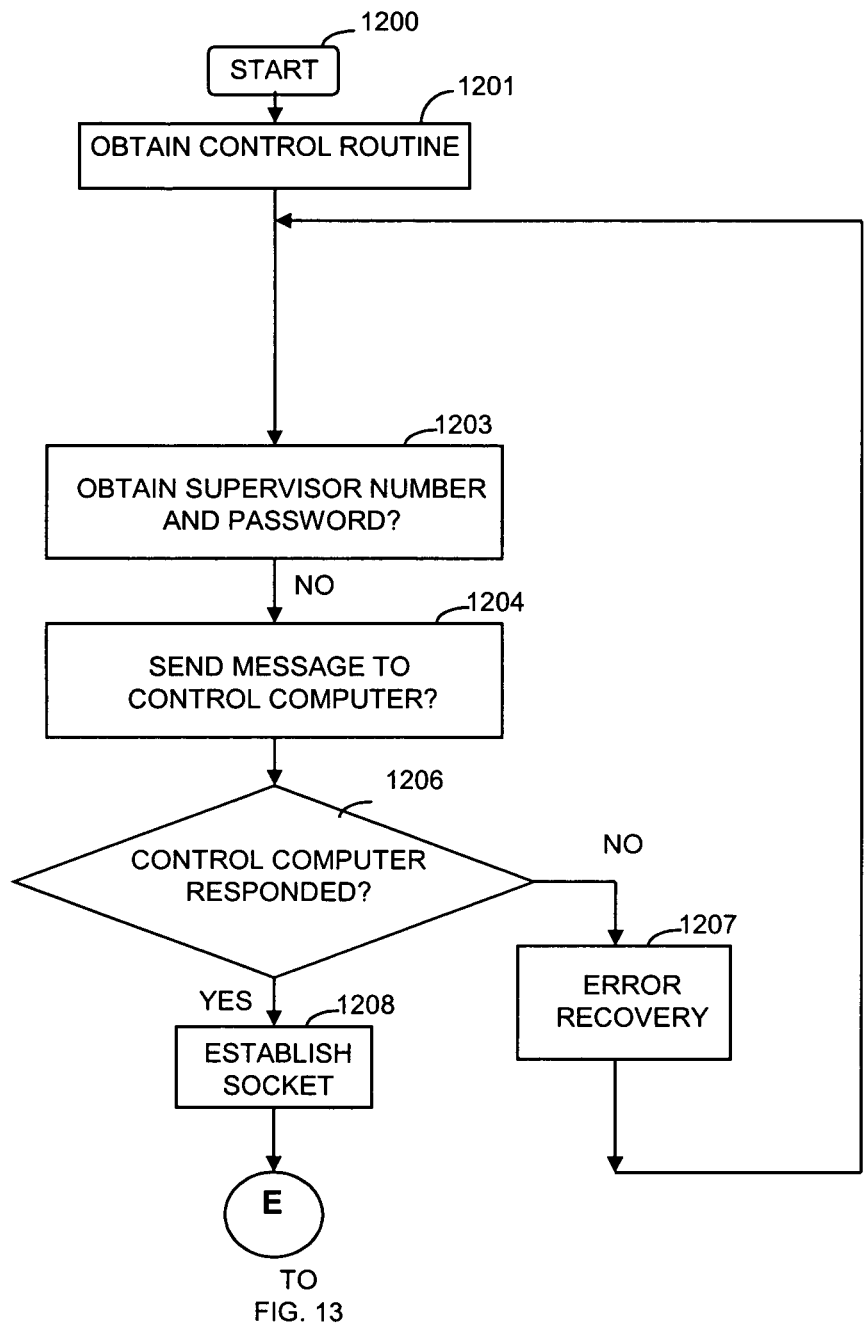
FIGS. 12-13 illustrate, in flow chart form, operations performed by another embodiment of a monitor computer.
Figure 13:
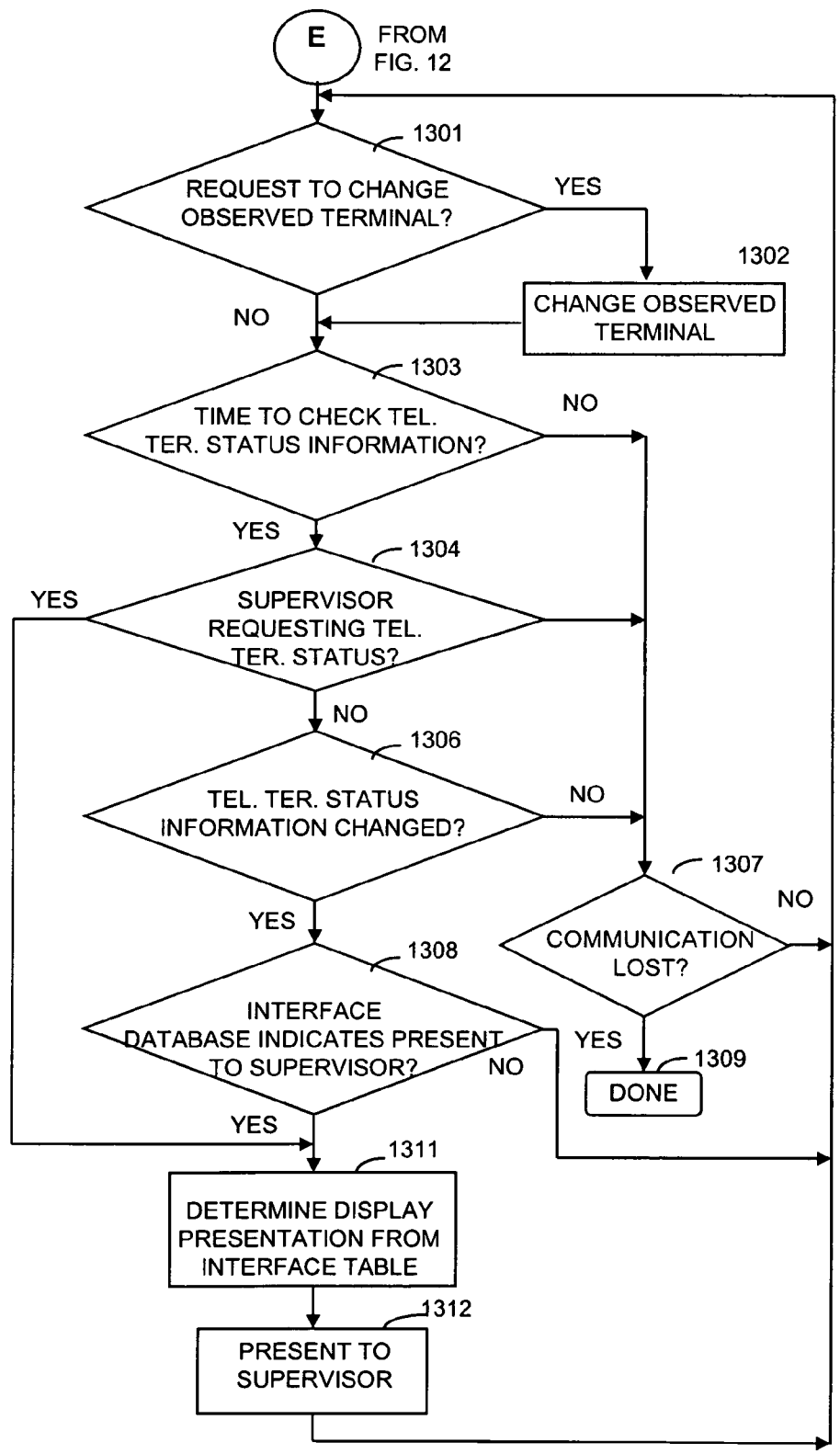

FIGS. 12 and 13 illustrate, in flowchart form, operations performed by one embodiment of a monitor computer such as PC 118 of FIG. 1 where the monitor computer is receiving the telecommunication terminal status information from a control computer that is controlling a switching system, such as telecommunication switching system 100. After being started, in block 1200, block 1201 obtains the control routine whose operations are illustrated in FIGS. 12-13. The control routine will be obtained from internal memory if the embodiment is implementing a thick client implementation; and the control routine will be obtained from a server, such as server 119 if the embodiment is implementing a thin client implementation.

After the control routine is obtained and executed, block 1203 obtains the supervisor number and password of the supervisor who is to do the monitoring. Block 1203 may perform this operation by obtaining them from a server such as server 119. In addition, the supervisor may know the supervisor number and password and enter them manually. After execution of block 1203, block 1204 transmits the supervisor number and password to the control computer.

After execution of block 1204, control is transferred to decision block 1206 which determines if the control computer responded and accepted the supervisor number and password as valid. One skilled in the art would readily realize that the supervisor number and password could be encrypted so that it was not possible for a computer to fraudulently gain access to the control status information of the supervisory group.

If the answer in decision block 1206 is no, control is transferred to block 1207 which performs error recovery before transferring control back to block 1203. If the answer is decision block 1206 is yes, block 1208 establishes a socket with the operating system of the control computer to obtain access to a telecommunication terminal status tables that the control computer maintains for the telecommunication terminals of the supervisory group. The socket establishes communication to the telecommunication terminal status control routine of the control computer before transferring control to decision block 1301 of FIG. 13.

Decision block 1301 determines if the supervisor is requesting to change the telecommunication terminal that is to be observed. If the answer is yes, control is transferred to block 1302 that transmits the change to the control computer before transferring control to decision block 1303. If the answer is no in decision block 1301, control is transferred to decision block 1303.

Decision block 1303 determines if it is time to check the telecommunication terminal status information for the observed telecommunication terminal by accessing the telecommunication terminal status table on the control computer. If the answer is no in decision block 1303, control is transferred to decision block 1307. Decision block 1307 determines if communication has been lost between the monitor computer and the control computer. If the answer is yes, operations are terminated in block 1309. In addition to transferring control to block 1309 upon communication being terminated between the monitored computer and the control computer, decision block 1307 also is responsive to supervisor input to terminate operations. If the answer is no in decision block 1307, control is transferred back to decision block 1301.

Returning to decision block 1303, if the answer is yes in decision block 1303, control is transferred to decision block 1304. Decision block 1304 determines if the supervisor is requesting that part or all of the telecommunication terminal status information in the telecommunication terminal status table for the observed telecommunication terminal be converted to enhanced telecommunication terminal status information and presented to the supervisor. The supervisor can make this request by actuation of a designated button on the telecommunication terminal used by the supervisor, predefined key/keys on the monitor computer, or by speaking a predefined set of words. Information in block 1311 determines if part or all of the telecommunication terminal status information will be converted. If the answer is yes in decision block 1304, control is transferred to block 1311 whose functions are described in later paragraphs. If the answer is no in decision block 1304, control is transferred to decision block 1306.

Decision block 1306 determines if telecommunication terminal status information has changed for observed telecommunication terminal. If the answer is no, control is transferred to decision block 1307. If the answer is yes in decision block 1306, control is transferred to decision block 1308 which access the interface database to determine if the particular telecommunication terminal status information should be presented to the supervisor. If the answer is no in decision block 1308, control is transferred back to decision block 1301. If the answer is yes in decision block 1308, control is transferred to block 1311.

Block 1311 accesses the appropriate enhanced telecommunication terminal status information from the interface database, and block 1312 presents the appropriate enhanced telecommunication terminal status information to the monitor computer before transferring control back to decision block 1306.

Figure 14:
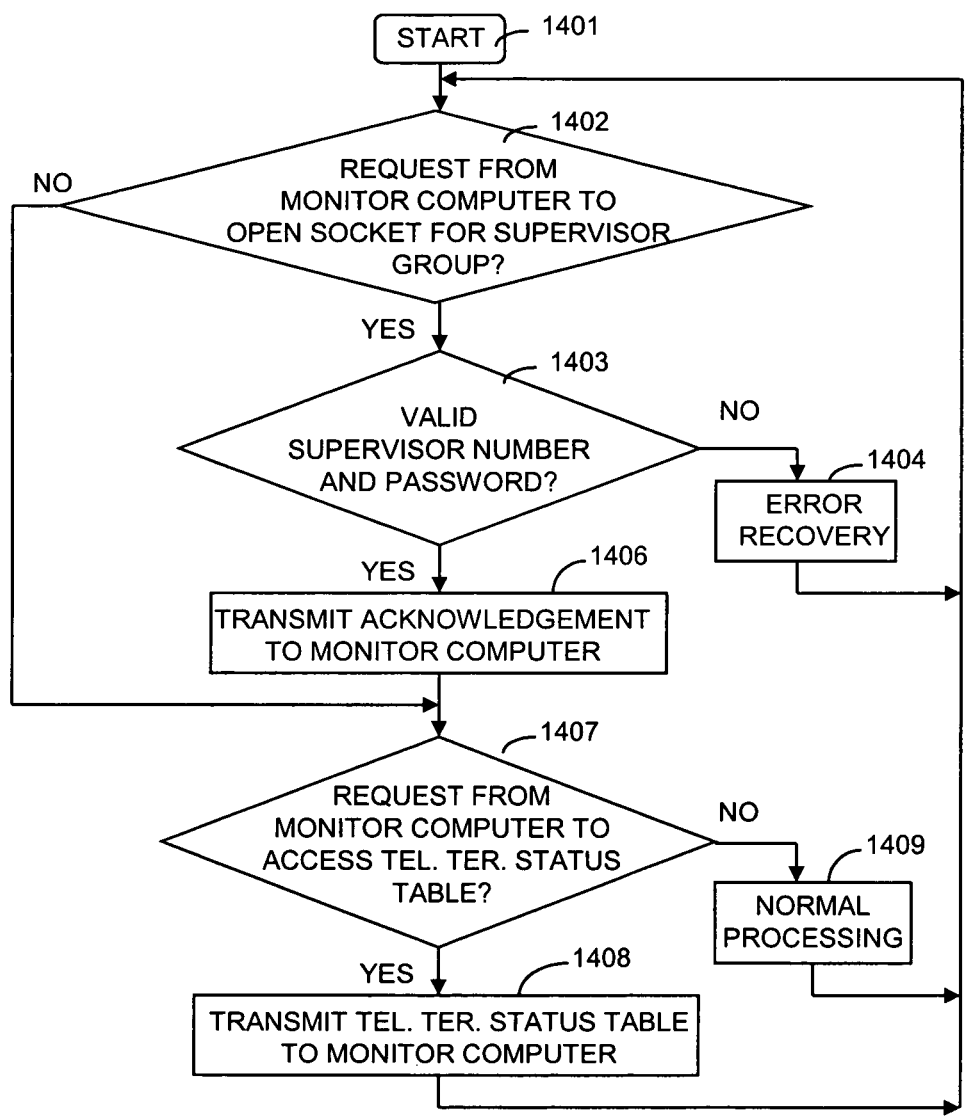
FIG. 14 illustrates, in flow chart form, operations performed by another embodiment of a control computer.

FIG. 14 illustrates an embodiment of the operations performed by a control computer when a monitor computer is accessing telecommunication terminal status tables stored in the control computer for a supervisory group. As is well known by those skilled in the art, a control computer controlling the operations of a telecommunication system maintains a telecommunication terminal status table for each telecommunication terminal connected to the telecommunication system regardless of whether this telephone is an IP, analog, proprietary digital protocol telephone, or ISDN telephone. Once started in block 1401, the control computer determines if there is a request from a monitor computer to open a socket to gain access to a telecommunication terminal status table for a supervisory group. If the answer is no, control is transferred to decision block 1407.

If the answer is yes in decision block 1402, control is transferred to decision block 1403. The latter decision block determines if the request from the monitor computer contains a valid supervisor number and password. If the answer is no, control is transferred to error recovery block 1404 which performs error recovery before transferring control back to decision block 1402. If the answer in decision block 1403 is yes, block 1406 transmits an acknowledgement to the monitor computer and sets up the necessary socket and software so that the monitor computer can obtain the requested telecommunication terminal status tables for telecommunication terminals of the supervisory group. Then block 1406 transfers control to decision block 1407.

Decision block 1407 determines if there is a request from a monitor computer to access a telecommunication terminal status table for the observed telecommunication terminal of the supervisory group. The monitor computer has to establish a socket via the operations of block 1406 to perform a request for a particular telephone. If the answer is no in decision block 1407, control is transferred to block 1409 which performs normal processing before transferring control back to decision block 1402. If the answer in decision block 1407 is yes, block 1408 transmits the telecommunication terminal status table for the particular telephone to the monitor computer before transferring control back to decision block 1402.

When the operations of an IP telephone set, control computer or monitor computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The IP telephone set, control computer or monitor computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where IP telephone set, control computer or monitor computer is implemented in hardware, IP telephone set, control computer or monitor computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for providing telephone set status information as enhanced telephone set status information, comprising:
    controlling calls of a telephone set by the telephone set by interacting with a control computer of a telecommunication switching system where the control computer provides direct control of the telecommunication switching system whereby the step of controlling provides call setup and subsequent call control;
    receiving from the control computer of the telecommunication switching system telephone set status information for the telephone set;
    displaying the received telephone set status information on the telephone set by the telephone set;
    establishing communication with the control computer of the telecommunication switching system controlling the telephone set by a monitor computer;
    directly accessing the telephone set status information from the control computer of the telecommunication switching system by the monitor computer via a path distinct from that used to transmit the telephone set status information to the telephone set;
    converting the telephone set status information to enhanced telephone set status telephone set status information by the monitor computer; and
    presenting the enhanced telephone set status information to a user of the telephone set.

2. The method of claim 1 wherein the enhanced telephone set status is audio telephone set status information.

3. The method of claim 2 wherein the presenting comprises producing the audio telephone set status information on the telephone set.

4. The method of claim 2 wherein the presenting comprises producing the audio telephone set status information on the monitor computer.

5. The method of claim 3 wherein the presenting further comprises transmitting the audio telephone set status information from the monitor computer to the telephone set.

6. The method of claim 1 wherein the monitor computer is at least one of a personal computer, personal digital assistant, server, or computer within the telephone set.

7. An apparatus for implementing the method of claim 6.

8. The method of claim 1 wherein the monitor computer connects to the telecommunication switching system via a wireless link.

9. The method of claim 1 wherein the telephone set is at least one of a wireless telephone set, IP telephone set, analog telephone set, proprietary digital telephone set or wired telephone set.

10. An apparatus for implementing the method of claim 9.

11. The method of claim 1 wherein the enhanced telephone set status is emphasized visual telephone set status information.

12. The method of claim 11 wherein the presenting comprises producing the emphasized visual telephone set status information on the telephone set.

13. The method of claim 11 wherein the presenting comprises producing the emphasized visual telephone set status information on the monitor computer.

14. The method of claim 12 wherein the presenting further comprises transmitting the emphasized visual telephone set status information from the monitor computer to the telephone set.

15. An apparatus for implementing the method of claim 1.

16. A method for providing telephone set status information as enhanced telephone set status information to a multi-paged telephone set, comprising:
    controlling calls of a multi-paged telephone set by the multi-paged telephone set by interacting with a control computer of a telecommunication switching system where the control computer provides direct control of the telecommunication switching system whereby the step of controlling provides call setup and subsequent call control;
    receiving from the control computer of the telecommunication switching system telephone set status information for the multi-paged telephone set;
    displaying the received telephone set status information on the multi-paged telephone set by the multi-paged telephone set;
    establishing communication with the control computer of the telecommunication switching system controlling the multi-paged telephone set by a monitor computer;
    directly accessing the telephone set status information from the control computer of the telecommunication switching system by the monitor computer via a path distinct from that used to transmit the telephone set status information to the multi-paged telephone set;
    converting the telephone set status information to the enhanced terminal status telephone set status information by the monitor computer upon an occurrence of at least one of the following a change in the telephone set status information being detected on any of the pages of the multi-paged telecommunication set or a request from the user to present the enhanced telephone set status information; and
    presenting the enhanced telecommunication terminal status information to a user of the multi-paged telephone set.

17. The method of claim 16 wherein the enhanced telephone set status is audio telephone set status information.

18. The method of claim 17 wherein the presenting comprises producing the audio telephone set status information on the multi-paged telephone set.

19. The method of claim 17 wherein the presenting comprises producing the audio telephone set status information on the monitor computer.

20. The method of claim 18 wherein the presenting further comprises transmitting the audio telephone set status information from the monitor computer to the multi-paged telephone set.

21. The method of claim 16 wherein the monitor computer is at least one of a personal computer, personal digital assistant, server, or computer within the multi-paged telephone set.

22. An apparatus for implementing the method of claim 21.

23. The method of claim 16 wherein the monitor computer connects to the telecommunication switching system via a wireless link.

24. The method of claim 16 wherein the enhanced telephone set status is emphasized visual telephone set status information.

25. The method of claim 24 wherein the presenting comprises producing the emphasized visual telephone set status information on the multi-paged telephone set.

26. The method of claim 24 wherein the presenting comprises producing the emphasized visual telephone set status information on the monitor computer.

27. The method of claim 25 wherein the presenting further comprises transmitting the emphasized visual telephone set status information from the monitor computer to the multi-paged telephone set.

28. The method of claim 16 wherein the converting comprises converting only the page on which the change occurred upon the occurrence of being by the change in the telephone set status information being detected on any of the pages of the multi-paged telephone set.

29. The method of claim 16 wherein the converting comprises converting only the page presently being displayed by the telephone set upon the occurrence being the request from the user to present the enhanced telephone set status information.

30. The method of claim 29 wherein the request is at least one of a button actuation on the key actuation on the monitor computer, or a voice command.

31. The method of claim 16 wherein the converting comprises converting all of the pages of the telephone set upon the occurrence being the request from the user to present the enhanced telephone set status information.

32. The method of claim 31 wherein the request is at least one of a button actuation on the telephone set, key actuation on the monitor computer, or a voice command.

33. An apparatus for implementing the method of claim 16.

34. A method for allowing an observing individual to observe telephone sets of an observed group by receiving enhanced telephone set status information for the telephone sets of the observed group, comprising:
controlling individual calls of each telephone set of the observed group by the each telephone set by interacting with a control computer of a telecommunication switching system where the control computer provides direct control of the telecommunication switching system whereby the step of controlling provides call setup and subsequent call control;
receiving from the control computer of the telecommunication switching system individual telephone set status information for the each telephone set by the each telephone set;
displaying the received individual telephone set status information on the each telephone set by the each telephone set;
establishing communication with the control computer of the telecommunication switching system controlling the telephone sets of the observed group by a monitor computer used by the observing individual whereby the observing individual is distinct from any user of one of the telephone sets of the observed group;
identifying one of the telephone sets of observed group that is to be observed by the monitor computer whereby the one of the telephone sets can be any one of the telephone sets of the observed group;
accessing the telephone set status information for the one of telephone sets from the control computer of the telecommunication switching system by the monitor computer;
converting the accessed telephone set status information to enhanced telephone set status information by the monitor computer; and
presenting the enhanced telephone set status information to the observing individual.

35. The method of claim 34 wherein the presenting comprises producing the enhanced telephone set status on a telephone set used by the observing individual.

36. The method of claim 34 wherein the presenting comprises producing the enhanced telephone set status on the monitor computer.

37. The method of claim 34 wherein the monitor computer is at least one of a personal computer, personal digital assistant, server, or computer within the telephone set.

38. The method of claim 34 wherein the enhanced telephone set status is audio telephone set status information.

39. The method of claim 38 wherein the presenting comprises producing the audio telephone set status information on a telephone set used by the observing individual.

40. The method of claim 38 wherein the presenting comprises producing the audio telephone set status information on the monitor computer.

41. The method of claim 39 wherein the presenting further comprises transmitting the audio telephone set status information from the monitor computer to the telephone set used by the observing individual.

42. The method of claim 34 wherein the monitor computer connects to the telecommunication switching system via a wireless link.

43. The method of claim 34 wherein a telephone set used by the observing individual is at least one of a wireless telecommunication set, IP telephone set, analog telephone set, proprietary digital telephone set or wired telephone set.

44. An apparatus for implementing the method of claim 43.

45. The method of claim 34 wherein the enhanced telephone set status is emphasized visual telephone set status information.

46. The method of claim 45 wherein the presenting comprises producing the emphasized visual telephone set status information on the monitor computer.

47. The method of claim 45 wherein the presenting comprises producing the emphasized visual telephone set status information on a telephone set used by the observing individual.

48. The method of claim 47 wherein the presenting further comprises transmitting the emphasized visual telephone set status information from the monitor computer to the telephone set used by the observing individual.

49. The method of claim 34 wherein the observed group is supervisory group and the observing individual is a supervisor.

50. An apparatus for implementing the method of claim 49.

51. An apparatus for implementing the method of claim 34.

52. A non-transitory computer-readable medium storing computer-executable instructions for execution by a computer for providing telephone set status information as enhanced telephone set status information, comprising the computer-executable instructions configured for:
controlling calls of a telephone set by the telephone set by interacting with a control computer of a telecommunication switching system where the control computer provides direct control of the telecommunication switching system whereby the step of controlling provides call setup and subsequent call control;
receiving from the control computer of the telecommunication switching system telephone set status information for the telephone set;
displaying the received telephone set status information on the telephone set by the telephone set;

establishing communication with the control computer of the telecommunication switching system controlling the telephone set by a monitor computer;

directly accessing the telephone set status information from the control computer of the telecommunication switching system by the monitor computer via a path distinct from that used to transmit the telephone set status information to the telephone set;

converting the telephone set status information to enhanced terminal status telephone set status information by the monitor computer; and presenting the enhanced telephone set status information to a user of the telephone set.

53. The non-transitory computer-readable medium storing computer-executable instructions for execution by the computer of claim 52 wherein the enhanced telephone set status is audio telephone set status information.

54. The non-transitory computer-readable medium storing computer-executable instructions for execution by the computer of claim 52 wherein the monitor computer is at least one of a personal computer, personal digital assistant, server, or computer within the telephone set.

55. The non-transitory computer-readable medium storing computer-executable instructions for execution by the computer of claim 52 wherein the telephone set is at least one of a wireless telephone set, IP telephone set, analog set, proprietary digital telephone set or wired telephone set.

56. The non-transitory computer-readable medium storing computer-executable instructions for execution by the computer of claim 52 wherein the enhanced telephone set status is emphasized visual telephone set status information.

57. A non-transitory computer-readable medium storing computer-executable instructions for execution by a computer for providing telephone set status information as enhanced telephone set status information to a multi-paged telephone set, comprising the computer-executable instructions configured for:

controlling calls of a multi-paged telephone set by the multi-paged telephone set by interacting with a control computer of a telecommunication switching system where the control computer provides direct control of the telecommunication switching system whereby the step of controlling provides call setup and subsequent call control;

receiving from the control computer of the telecommunication switching system telephone set status information for the multi-paged telephone set;

displaying the received telephone set status information on the multi-paged telephone set by the multi-paged telephone set;

establishing communication with the control computer of the telecommunication switching system controlling the multi-paged telephone set by a monitor computer;

directly accessing the telephone set status information from the control computer of the telecommunication switching system by the monitor computer via a path distinct from that used to transmit the telephone set status information to the multi-paged telephone set;

converting the telephone set status information to the enhanced terminal status telephone set status information by the monitor computer upon an occurrence of at least one of the following a change in the telephone set status information being detected on any of the pages of the multi-paged telephone set or a request from the user to present the enhanced telephone set status information; and presenting the enhanced telephone set status information to a user of the multi-paged telephone set.

58. The non-transitory computer-readable medium storing computer-executable instructions for execution by the computer of claim 57 wherein the enhanced telephone set status is audio telephone set status information.

59. The non-transitory computer-readable medium storing computer-executable instructions for execution by the computer of claim 57 wherein the monitor computer is at least one of a personal computer, personal digital assistant, server, or computer within the multi-paged telephone set.

60. The non-transitory computer-readable medium storing computer-executable instructions for execution by the computer of claim 57 wherein the enhanced telephone set status is emphasized visual telephone set status information.

61. The non-transitory computer-readable medium storing computer-executable instructions for execution by the computer of claim 60 wherein the computer-executable instructions for presenting comprise computer-executable instructions for producing the emphasized visual telephone set status information on the multi-paged telephone set.

62. The non-transitory computer-readable medium storing computer-executable instructions for execution by the computer of claim 57 wherein the computer-executable instructions for converting comprise converting only the page on which the change occurred upon the occurrence of being by the change in the telephone set status information being detected on any of the pages of the multi-paged telephone set.

63. The non-transitory computer-readable medium storing computer-executable instructions for execution by the computer of claim 57 wherein the computer-executable instructions for converting comprise converting only the page presently being displayed by the telephone set upon the occurrence being the request from the user to present the enhanced telephone set status information.

64. A non-transitory computer-readable medium storing computer-executable instructions for execution by a computer for allowing an observing individual to observe telephone sets of an observed group by receiving enhanced telephone set status information for the telephone sets of the observed group, comprising the computer-executable instructions configured for:

controlling individual calls of each telephone set of the observed group by the each telephone set by interacting with a control computer of a telecommunication switching system whereby the step of controlling provides call setup and subsequent call control;

receiving from the control computer of the telecommunication switching system individual telephone set status information for the each telephone set by the each telephone set;

displaying the received individual telephone set status information on the each telephone set by the each telephone set;

establishing communication with the control computer of the telecommunication switching system controlling the telephone sets of the observed group by a monitor computer used by the observing individual whereby the observing individual is distinct from any user of one of the telephone sets of the observed group;

identifying one of the telephone sets of observed group that is to be observed by the monitor computer whereby the one of the telephone sets can be any one of the telephone sets of the observed group;

accessing the telephone set status information for the one of telephone sets from the control computer of the telecommunication switching system by the monitor computer;

converting the accessed telephone set status information to enhanced telephone set status information by the monitor computer; and presenting the enhanced telephone set status information to the observing individual.

65. The non-transitory computer-readable medium storing computer-executable instructions for execution by the computer of claim 64 wherein the computer-executable instructions for presenting comprise computer-executable instructions for producing the enhanced telephone set status on a telephone set used by the observing individual.

66. The non-transitory computer-readable medium storing computer-executable instructions for execution by the computer of claim 64 wherein the enhanced telephone set status is audio telephone set status information.

67. The non-transitory computer-readable medium storing computer-executable instructions for execution by the computer of claim 64 wherein the monitor computer connects to the telecommunication switching system via a wireless link.

68. The non-transitory computer-readable medium storing computer-executable instructions for execution by the computer of claim 64 wherein a telephone set used by the observing individual is at least one of a wireless telephone set, IP telephone set, analog telephone set, proprietary digital telephone set or wired telephone set.

69. The non-transitory computer-readable medium storing computer-executable instructions for execution by the computer of claim 64 wherein the enhanced telephone set status is emphasized visual telephone set status information.

70. The non-transitory computer-readable medium storing computer-executable instructions for execution by the computer of claim 64 wherein the observed group is a supervisory group and the observing individual is a supervisor of the supervisory group.

* * * * *